United States Patent [19]

Kobus

[11] 4,322,160

[45] Mar. 30, 1982

[54] DOCUMENT REGISTRATION APPARATUS AND METHOD

[75] Inventor: Gerhard S. Kobus, Pittsford, N.Y.

[73] Assignee: Xerox Corporation, Stamford, Conn.

[21] Appl. No.: 125,818

[22] Filed: Feb. 29, 1980

[51] Int. Cl.³ .............................................. G03B 27/62
[52] U.S. Cl. ..................................... 355/75; 271/245; 355/3 SH
[58] Field of Search ............... 355/75, 3 SH; 271/245, 271/246, 18 R

[56] References Cited

U.S. PATENT DOCUMENTS

| | | |
|---|---|---|
| 3,504,908 | 4/1970 | Krueger. |
| 3,536,320 | 10/1970 | Derby. |
| 3,720,408 | 3/1973 | Horn ................................. 271/18 R |
| 4,043,665 | 8/1977 | Caldwell. |
| 4,097,146 | 6/1978 | Sasamori. |
| 4,132,401 | 1/1979 | Gauronski et al. |
| 4,247,095 | 1/1981 | May ..................................... 271/233 |
| 4,250,538 | 2/1981 | Durbin et al. ......................... 362/97 |
| 4,268,022 | 5/1981 | Looney ................................... 271/7 |

Primary Examiner—Monroe H. Hayes

[57] ABSTRACT

Positive registration of an original document to the edge of a copier platen (12, 108, 208) together with unidirectional feeding across the platen is provided by intermittently pivoting the platen. Document sheets transported by document transport belts (36, 101, 202) in a movement path over the transparent copying window (12, 108, 208) of a copier and over a fixed edge member (30, 112, 220), are registered and then fed by intermittently slightly lifting with a non-imagable electrical drive (18, 102, 212) one end (20, 106, 216) of the transparent window adjacent the fixed edge member. This interposes and intermittently removes a document sheet obstructing registration surface (66, 114, 218) in the movement path of the document. The fixed edge member (30, 112) can provide manual document registration on the platen without requiring retraction for automatic document feeding.

22 Claims, 5 Drawing Figures

DOCUMENT REGISTRATION APPARATUS AND METHOD

A document registration apparatus and method for registering a document sheet which is transported over the transparent window of a copier to be copied by shifting the position of the transparent window relative to an adjacent fixed member.

For the faster xerographic and other document copiers now in commercial use, it is increasingly desirable to provide for the automatic handling of the individual original document sheets being copied, in order to utilize the higher speed copying capabilities of those copiers. However, such documents can vary widely in sheet size, weight, thickness, material, condition, humidity, age, and value. The documents may have curls, wrinkles, tears, "dog-ears", cut-outs, overlays, paste-ups, tape, staples, adhesive areas, or other irregularities. Yet it is desirable to semiautomatically or automatically feed and copy a set of documents with a mixture of sizes, types, and conditions, without document jams or document damage. Further, it is desirable to handle such documents with a relatively compact and inexpensive document handling system. Also, such a document handling system is preferably one which utilizes the existing or basically conventional external transparent copying window (known as the platen) of the copier, so as to utilize the same existing optics system. To these ends it is also desirable to image the document at the existing or conventional manual registration position on the platen. That is, it is desirable that the automatic or semiautomatic document handling system be readily removable from the platen area by the copier operator to provide conventional manual placement of documents, including books, on the same copying platen, to be imaged by the same optics.

Such a manual copying registration position is conventionally provided by a fixed raised registration edge or edges extending linearly along one or two sides of the platen, fixed to the copier body, or fixed along one or two edges of the platen glass. The platen glass is conventionally also stationarily mounted on the copier body.

One of the most important, and difficult to achieve, requirements for automatic or semi-automatic document handling is the accurate and reliable, but safe, transporting and registration of the original document to and from the proper position for copying. Conventionally the document is desirably automatically accurately center registered or corner registered (depending on the copier) by the document handler at a pre-set registration position relative to the copier platen, with one edge, or two edges, of the document aligned with a registration line or lines adjacent one or two edges of the copier platen. This registration accuracy is desirably consistently within less than 1 millimeter. If the document is not properly registered, or slips after registration, then undesirable dark borders and/or edge shadow images may appear on the ensuing copy, or information near the edges of the document may not be copied.

Various known document handling systems have been provided with various document transports to move the original document sheets over the copier platen and into and out of registration. The document transports may comprise single or multiple belt transports, or feed wheels, utilizing frictional, vacuum, or electrostatic driving forces. Various combinations of such over-platen transports are known with various registration devices or systems.

It is known in the art to register the original document for copying at the appropriate position relative to the transparent copying window in various ways. Typically the document sheet is registered by driving it against a gate or stop. This may comprise projecting aligned fingers, or roller nips, or a single vertical surface, against which an edge of the sheet is driven into abutment. An important function of such registration is to de-skew the moving original document, i.e., to properly align it with the registration line, as well as to determine and control its position.

The type of document transport and registration system is affected by the type of copier optics, i.e., the copying system. In a constant velocity document transport (CVT) system, in which the document is copied by being moved at a constant velocity over a small (narrow) scanning window of a fixed optics system by its transport, it is generally preferably to preregister the document to its transport just before the document is transported over the copying window. As disclosed in U.S. Pat. No. 3,536,320 issued Oct. 27, 1970 to D. R. Derby, (and similarly shown in U.S. Pat. No. 3,552,739) referring particularly to FIG. 5, this CVT pre-registration has been previously known with rotation of an adjacent member 170 which lifts the lead edge of the document and allows it to be transported over a fixed registration edge 168 at 173 by the transport belt 140 at the appropriate time to start imaging the document 166 by passing it at a constant velocity over the platen 12.

On the other hand, in most other types of copying systems the document is registered overlying a full sized (full frame) platen. In such systems the document is either scanned while it is held stationary over the platen, or optically stopped by flash illumination through the platen of the entire document as soon as it has been registered. In these full frame systems the document is preferably registered to a fixed pre-set position over the platen glass adjacent one side or edge thereof. As disclosed in U.S. Pat. No. 4,043,665 issued Aug. 23, 1977 to J. R. Caldwell, and U.S. Pat. No. 4,132,401 issued Jan. 2, 1979 to J. F. Gauranski, et al., this can be done by preregistering the document to a transport belt with upstream, off-platen, pre-registration fingers or rollers, and then moving the document a known distance over the platen on the belt into registration, providing there is no slippage during this entire movement between the document and the belt. However, more typically and more desirably it is desired to provide either fixed or retractable registration fingers, gates or stop edges aligned along the one edge of the platen to actually register the document in its copying position without such transport criticality. The document transport can slip briefly relative to a document striking the stop until positive de-skewing and full registration are achieved. As noted above, it is also desirable for the same registration member to provide for manual registration placement of a document.

Examples of retractable registration finger or gate systems are disclosed, for example, in the references cited in the above-cited U.S. Pat. No. 4,043,665. U.S. Pat. No. 3,941,376 issued Mar. 2, 1976 shows one with a reversible single belt. U.S. Pat. No. 3,844,552 issued Oct. 29, 1974 to C. D. Bleau et al. shows plural registration fingers extendable between plural document belts at a beveled edge of the platen. Another retractable gate 73,74 system is shown, in a recirculating document handler, in U.S. Pat. No. 4,169,674 issued Oct. 2, 1979 to M. J. Russel. Retractable registration fingers, could also, of course, be used for manual registration, but not as desirably. They require an actuation mechanism and have other disadvantages as discussed below.

Examples of document handling systems in which the document is registered on the platen using a fixed (non-retractable) registration stop against which the document is driven by a transport are disclosed, for example, in the following U.S. Pat. Nos. 4,146,220 issued Mar. 27, 1979 to P. Barton; 3,504,908 issued Apr. 7, 1970 to J. R. Kreuger; and 4,033,574 issued July 5, 1977 to K. K. Stange.

As noted, the use of a fixed stop projecting above the plane of the platen as disclosed in such references has the potential for allowing this same registration edge to be utilized for manual registration of a document as well. However, it has the significant disadvantage, that, if this registration edge is not retracted, the document cannot be readily fed over it by the same transport, unless part of the transport is lifted. This conventionally limits the document feeding path for a fixed registration edge document handler to one of two reversing document motion types. In one type the document is fed forward onto the platen over an upstream raised registration edge, and then the document belt is reversed in direction, while it is held down, to drive the rear or trail edge of the document into alignment with this upstream fixed registration edge. Then after copying, the document belt must be reversed again to resume its forward motion to eject the document from the downstream side of the platen. Note, e.g., U.S. Pat. No. 3,504,908 cited above. In the other type, the fixed, permanently raised, registration edge is located at the downstream end of the platen. The document is registered by driving it downstream across the platen into the downstream registration edge. Then, after copying, the document transport is reversed in direction to feed the document back off from the upstream end of the platen. A disadvantage of this type is that since the document is being fed off from the same side of the platen from which it was fed on, only one document at a time can be handled by an over-platen document belt transport. That is, the subsequent document cannot be fed onto the platen until the preceeding document is ejected from the platen by the belt. With such a "Y" shaped bi-directional platen transport system the documents cannot be recirculated in a uni-directional endless loop to and from the platen. This normally requires either a longer document changing time or a faster document transport.

For the above reasons, the use of retractable registration edges has been generally preferred for modern high speed document handling systems. This allows the document to be fed off the platen over the retracted registration member while the next document is being fed on with the same, uni-directional, transport.

However, such retractable registration stops have significant disadvantages. The retractable fingers may have timing or positioning difficulties in preventing escape or slippage of the document from between the fingers and the moving document transport belt, particularly for uniform single belts and for certain document weights and conditions. Also, if a document is stopped by only one out of two or more spaced registration fingers, it can become skewed. Misregistration can cause image loss and edge or background effects, as noted above. Mis-registration can also cause serious problems in the further transporting of the document. Slippage can cause wrinkling, abrasion, or tearing of the original documents if they are driven over raised fingers by the document belt. Additionally, in a movable registration gate, there is typically a small gap between the registration gate and the edge of the platen. The edge of the platen glass is typically beveled to allow the registration gate to slide over it at an acute angle relative to the upper surface of the platen to help capture the document, as in U.S. Pat. No. 3,844,552 cited above. Thus, the document lead edge, particularly if it is downwardly curled, can become caught in this space between the registration gate and the end of the platen and pulled downwardly into this space as the registration gate is retracted (which happens before the document is to be driven off the platen).

The present invention is not limited to any particular or specific type of document illumination or optics system, and is applicable to, for example, either scanning lamp (stationary document) copying, or moving document (stationary optics) copying. However, it is particularly suitable for "full frame" imaging in which the document is copied after being registered at a stationary position overlying a full size platen. In such copying, flash illumination of the document from a light reflective cavity below the platen is desirable, since this assists in eliminating document and document belt edge shadows. An example of one such illumination system is disclosed in U.S. application Ser. No. 15,558, now U.S. Pat. No. 4,250,538, filed Feb. 22, 1979 by John A. Durbin et al., and its cited art.

For any such systems, for optical reasons, it has been heretofore considered essential that the platen glass or other transparent imaging window of the copier be maintained in a fixed position relative to the body or frame of the copier. The upper surface of the platen is conventionally horizontal and perpendicular the optical imaging path (optical axis) at all times. Repositioning the platen slowly along the optical axis when the copier is not making copies is known for changing the copying magnification of the document as disclosed in Japanese Utility Model Laid Open No. 52-155552 based on Japanese Utility Model Application No. 51-64663 filed May 20, 1976 by Dai Nippon Screen Seizo KK. The horizontal orientation of the platen perpendicular the optical axis is not changed for such a magnification change.

The present invention overcomes or minimizes the above-discussed problems, and provides a low cost and simple document handling apparatus and method in which the advantages of a fixed registration edge as discussed above are provided, yet without its respective disadvantages, e.g., with the document path and feeding advantages of a retractable registration edge. In particular, the present invention provides for document registration systems in which the same, fixed, registration edge may be utilized for both manual copying on the platen and for semi-automatic, automatic and/or recirculative document feeding and registration, and yet in which the documents may be unobstructedly fed over this fixed registration edge to allow either bi-directional or unidirectional document feeding. The present invention may be used in many different types of document handling systems, including various of those disclosed in the above-cited incorporated references.

In the present invention, the platen glass or other transparent window of the copier is repositioned intermittently relative to an adjacent fixed surface to intermittently provide a positive registration stop for the documents, and to intermittently eliminate that stop for unobstructed feeding of the documents. This repositioning need only be a slight pivotal tilting from the horizontal of the end of the window adjacent the fixed surface by less than one centimeter.

There is disclosed hereinbelow a document registration apparatus and method for registering of a document sheet transported over the transparent window of a copier and a fixed edge member characterized by intermittently shifting the position of one edge of the transparent window into and out of alignment with this fixed edge member to intermittently provide a sheet stopping alignment surface which is effectively removable from the movement path of the document over the transparent window by this shifting in position of the transparent window.

The invention will be better understood by reference to the following description of specific examples thereof, which includes the following drawing figures (approximately to scale) wherein.

Figure 1:
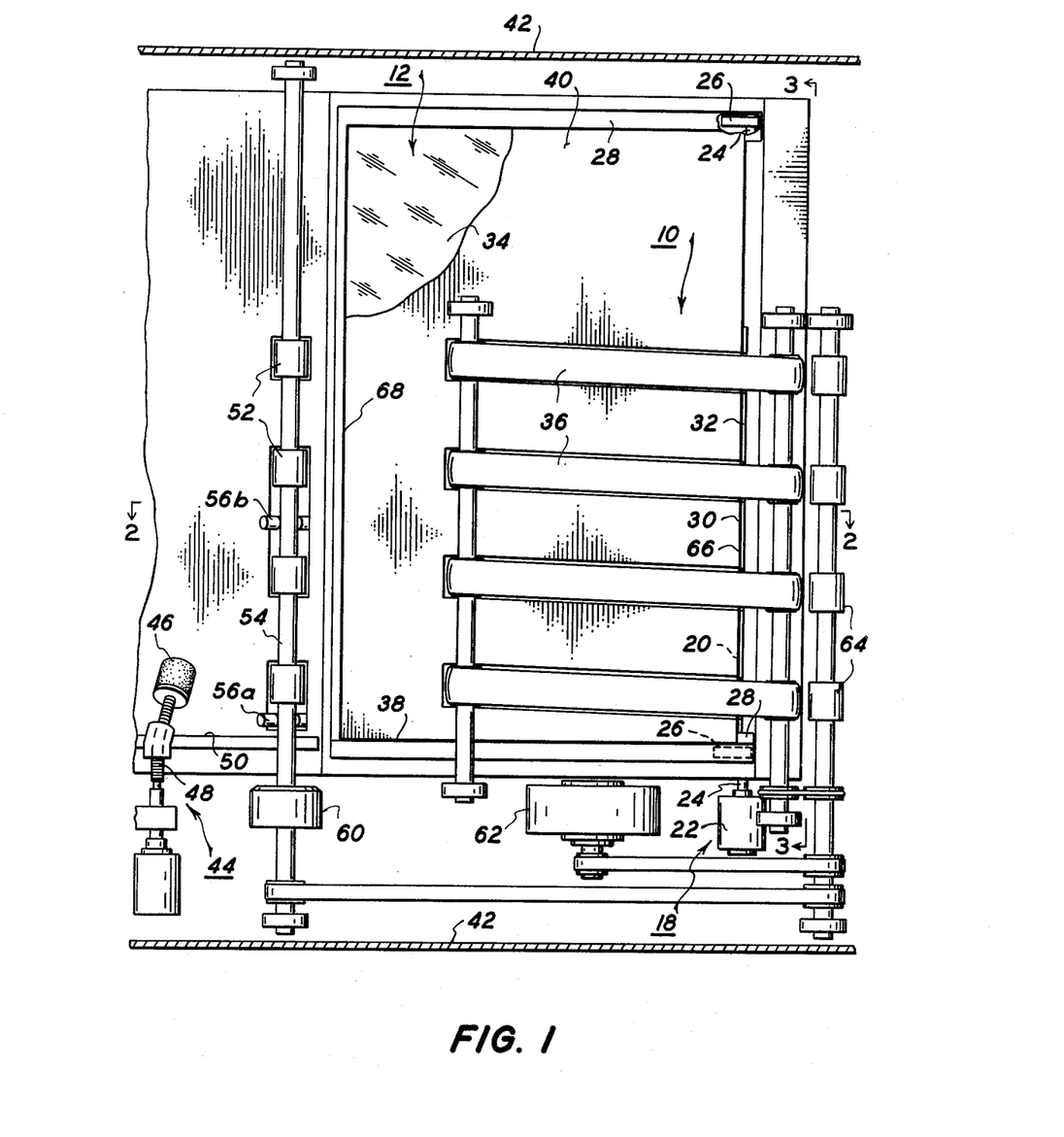
FIG. 1 is a top view of an exemplary document handling apparatus incorporating one example of a document registration apparatus in accordance with the present invention.
Figure 2:
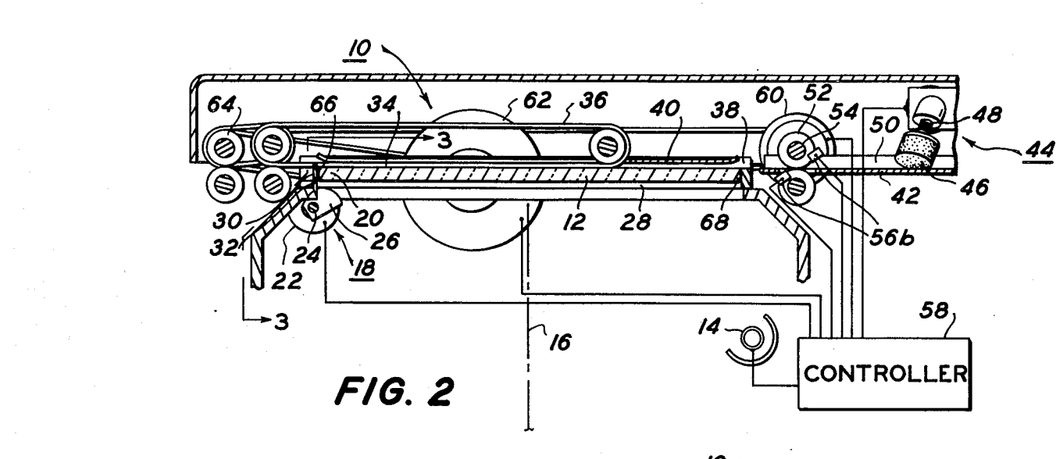
FIG. 2 is a cross-sectional side view along the lines 2—2 of FIG. 1.
Figure 3:
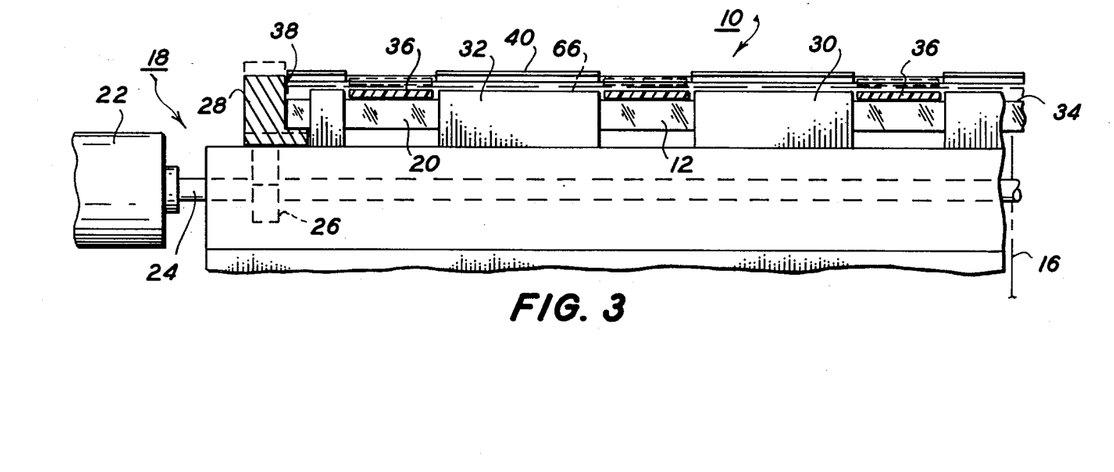
FIG. 3 is a cross sectional end view along the lines 3—3 of FIG. 1 and FIG. 2.
Figure 4:
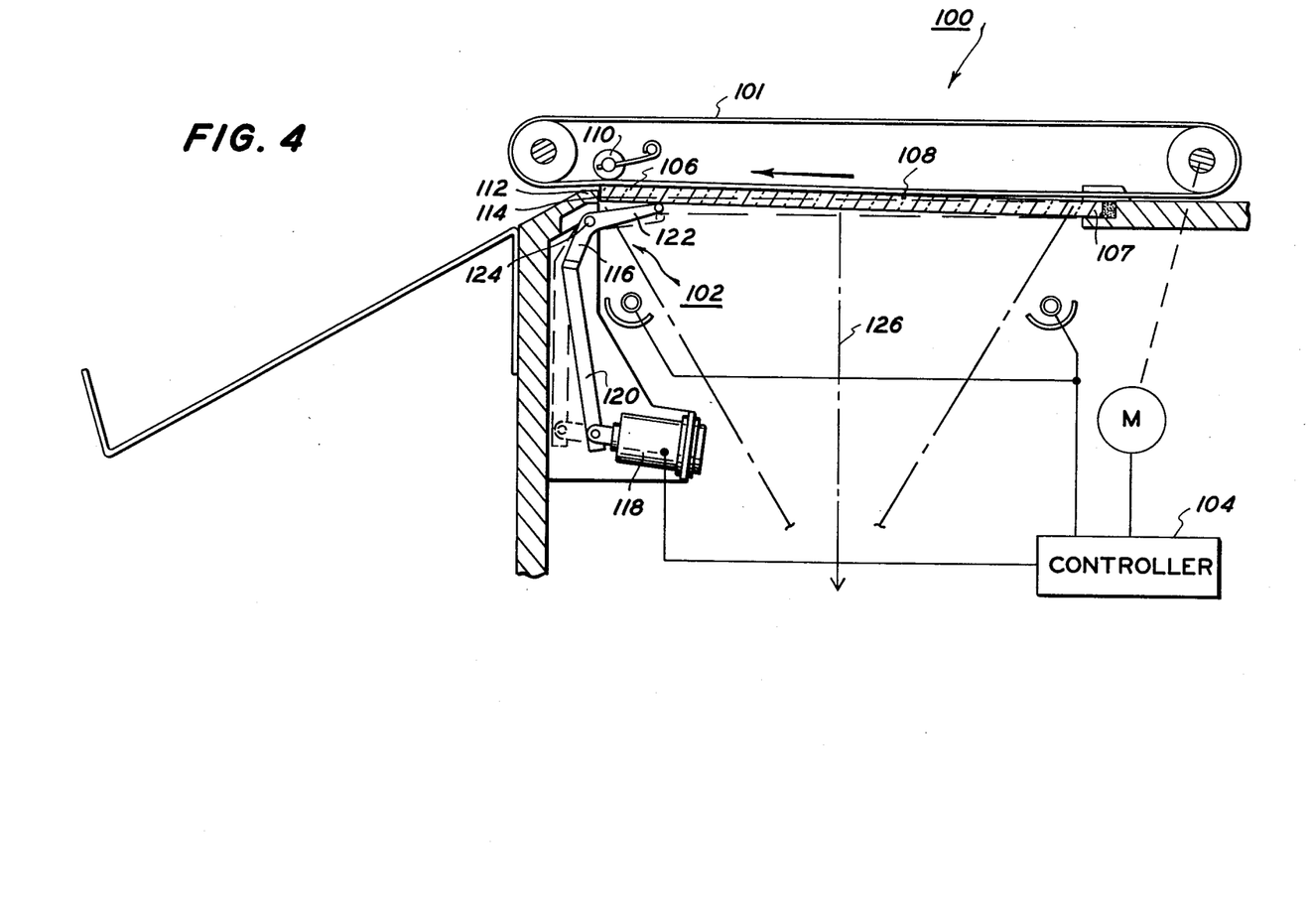
FIG. 4 is a cross sectional side view of a second document registration apparatus and document feeder example.
Figure 5:
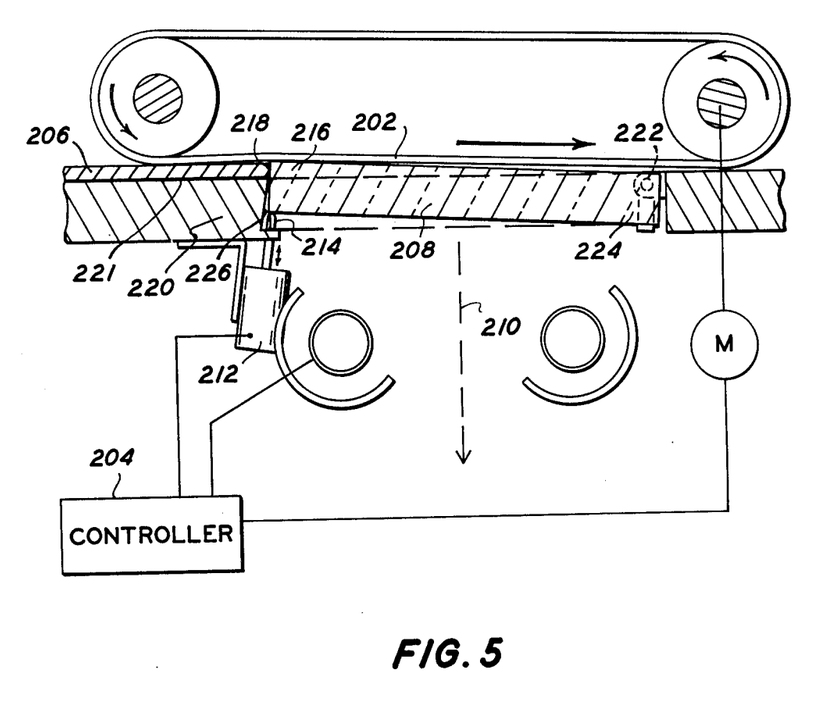
FIG. 5 is a third example of the invention, in a constant speed moving document, stationary scanning optics, document handler.

Various of the following descriptions of FIGS. 1-3 are also applicable to the subsequent descriptions of FIGS. 4 and 5. Referring first to the embodiment of FIGS. 1-3, it is shown incorporated in an example of a semi-automatic document transport 10. The transport 10 moves original document sheets in a movement path 40 over the transparent copying window or platen 12 of a copier, for registering and copying the documents, and then ejecting them from the platen. Since the copier, and its optics, may be any of various known types, it is only disclosed here to the extent that this document handling unit 10 interfaces therewith.

As is conventionally practiced in xerography, the document is exposed on the transparent platen 12 by flash lamps 14 or other illumination systems. The image of the document is conventionally focused through a fixed or scanning lens, directly or through a mirror arrangement, onto the conventional photoreceptor of the copier along an optical axis 16. Conventionally, and highly desirably, the platen 12 is perpendicular this optical axis 16 during the copying of the document thereon.

However, there is very unconventionally additionally provided here a platen shifting means 18 for intermittently lifting the position of one end 20 of the platen 12 intermittently to provide a removable registration means for the documents, interacting with the document transport 10, as will be described herein. Although it could even be manually activated, in the example of FIGS. 1-3 this platen shifting means 18 is powered by a conventional small, low power, geared electric motor 22 rotating a shaft 24. As particularly shown in FIGS. 2 and 3, this shaft 24 has eccentric cams 26 at both ends thereof. These cams 26 provide a slight, and leveraged, lifting of both sides of the free end 20 of the platen 12 upon each rotation of the shaft 24 by the motor 22. The cams 26 may act directly on the platen glass itself, or, as illustrated here, against a metal platen edge frame or support 28.

It may be seen that the entire shifting means 18 including the cams 26 is positioned at all times outside of the copying area of the platen 12. I.e., it is not itself imaged, and does not obstruct in any way the normal copying of documents on the platen 12.

As particularly shown in FIG. 3 by the difference between the dashed line and solid line positions, (exaggerated for drawing clarity) the actuation of the platen shifting means 18 slightly lifts the free end 20 of the platen 12 relative to an adjacent fixed edge member 30. The upper surface 34 of the platen at the end 20 is moved from below to above the upper surface of the fixed edge member 30, i.e., towards alignment therewith and beyond. The fixed edge member 30 provides the registration edge against which the documents are driven for deskewing and registration. The edge member 30 is integrally attached to the frame of the copier. It is not a retractable registration edge. In this particular multi-belt embodiment the registration edge member 30 comprises, as illustrated in FIG. 3, a spaced plurality of upstanding fingers 32 for temporarily stopping the document by capturing its lead edge. These fingers 32 normally extend slightly, e.g., 1 to 2.5 millimeters above the normal position of the upper surface 34 of the platen. To express it another way, except when the platen is lifted by the shifting means 18, the uppermost portions or tips of these fingers 32 extend above the plane of the upper surface 34 of the platen. These fingers 32 are aligned transverse the document movement path along the downstream edge or end of the platen 12, at the limit of the optical image area on that side of the platen, to form the downstream registration line for the copier.

As further shown in FIGS. 1 and 3, the fingers 32 normally extend up between (i.e., are interdigitated with) the disclosed spaced plurality of document feed belts 36. These belts 36 comprise deformable belt document feeding flights normally extending over the fixed edge member 30 through recesses between the fingers 32. This provides for more positive registration by insuring that the fingers 32 stop the lead edge of the document, since the belt 32 holds the document down against the platen below the fingers 32.

For a corner registered copier, as the embodiment of FIGS. 1-3, an additional, orthogonal, fixed registration edge may be provided by a side guide 38 extending along one side of the platen in the direction of document feeding. By skewing the document belts 36 at a slight angle, e.g., 2 degrees, toward this side guide 38 the document may be registered to the side guide 38 simultaneously with its lead edge registration to the fixed edge member 30, to provide corner registration. Such angling of multiple document belts is disclosed in U.S. Pat. No. 4,147,339 issued Apr. 3, 1979 to T. Shiina.

It will be noted that the multiple belts 36 shown here do not extend across the entire platen. The belt length is confined to that of the shortest (narrowest) document which will normally be copied on the platen, to avoid "show-around" exposure of the belts 36 onto the copies, which would otherwise occur for such smaller documents, as described in U.S. patent application S.N. 71,330 filed Aug. 30, 1979 by J. L. Looney, pending, of which a related application with a common specification has now issued as U.S. Pat. No. 4,268,022.

The document may be further confined over the entire platen 12 to within the depth of field of the optical system by a closely overlying, light reflective, generally planar, platen cover plate 40. Slots are provided in this plate 40 for the belt 36 to extend through. The upstream and downstream edges of the plate 40 may be curved upwardly to provide additional feeding clearance. The bottom surface of this document flattening plate 40 may be maintained spaced by approximately 1 millimeter from the upper surface 34 of the platen. This provides for unobstructed feeding of documents between the plate 40 and the platen as disclosed in U.S. Pat. No. 3,888,581 issued June 10, 1975 to J. R. Caldwell.

It will be appreciated, of course, that the entire document handling unit is preferably conventionally pivotably mounted, by its frame and cover unit 42, to the frame of the copier. Thus, the entire document handling unit can be pivoted up away from the platen and the adjacent fixed edge member 30, to allow unobstructed manual placement and copying of a document on the platen using the same fixed registration edge members 30 and 38 as are utilized for the above-described automatic registration of documents.

In the embodiment of FIGS. 1–3 which is a semi-automatic document handling unit, a known preregistration pre-feeder 44 is also disclosed. This manual document input feeder 44 would not be needed for a recirculating document handler. However it can also be used for a combined RDH/SADH unit. The example here is a known foraminous high speed corner jogger wheel 46 on a flexible angled shaft 48. This corner jogger 46 grabs a manually inserted document and drives it quickly into a corner pre-registration position. One side of the document is pre-registered against an input side guide 50 (aligned with, but slightly inside of, the side guide 38). Simultaneously, the lead edge of the document is pre-registered to the line of nips of the (normally non-rotating) feed-in rollers 52. Other examples of a corner jogger are disclosed in U.S. Pat. No. 4,179,117 issued Dec. 18, 1979 to J. H. Rhodes, Jr., and the art cited therein.

The feed-in rollers 52 are on a common shaft 54 adjacent the upstream edge of the platen. They are parallel the downstream registration line formed by the registration fingers 32. When a document has been driven in by wheel 46 sufficiently, i.e., sufficiently de-skewed, the document lead edge actuates two photosensors 56a and 56b closely adjacent this nip line of the rollers 52. The document handling unit is then in condition for the further feeding-in of the document to the platen by the rotation of rollers 52, i.e., the document is pre-registered.

Examples of such document input sensor controls are more fully described, for example, in U.S. Pat. No. 4,132,401 issued Jan. 2, 1979 to J. F. Gauronski, et al., and its cited art.

As shown here in FIG. 2, all of the electrically actuated components are conventionally electrically connected to and controlled by the controller 58 of the copier. This controller 58 is preferably of a conventional and known type such as a programmable microprocessor or other suitable or known software or hardware logic systems. Some examples are disclosed in U.S. Pat. Nos. 4,099,150 issued July 4, 1978 to J. L. Conin; 4,125,325 issued Nov. 14, 1978 to P. J. Batchelor, et al.; 4,144,550 issued Mar. 13, 1979 to J. K. Donohue et al.; 4,144,550 issued Mar. 13, 1979 to J. K. Donohue; et al., and 4,123,155 issued Oct. 31, 1978 to W. L. Hubert.

Upon receipt by the controller 58 of the input from both sensors 56a and 56b, and other signals indicative of the readiness of the copier for copying, the controller 58 actuates the feed-in rollers 52. Here this is accomplished by an electrically actuated clutch 60 on the shaft 54. With the clutch 60 actuated, the rollers 52 and their mating idler rollers in the frame of the copier, shown in FIG. 2, drive the document onto and over the platen under the plate 40 until the lead edge of the document is captured by the document belts 36. The belts 36 then transport the document the rest of the way across the platen into final registration. The belts 36 are driven by a common drive motor 62, likewise actuated by the controller 58 at, and for, an appropriate time period.

The motor 62 may also be utilized to drive a separate set of feed-out rollers 64 downstream of the platen, as shown in FIGS. 1 and 2. These feed-out rollers 64 are not skewed like the belts 36 and, therefore, provide for straight-out ejection of the documents into a suitable stacking tray.

For drawing clarity the mountings of the shaft ends and other components disclosed in FIGS. 1 and 2 to the frame/cover unit 42 are not illustrated. These may be conventionally spring loaded within the document handling unit for controlled pressure engagement with their mating components on the copier.

It will be appreciated that with the document transport units disclosed here the documents can be fed in the normal face-down forward serial order, i.e., 1 to N order. This produces copies in that same order. By stacking the copies face-down at the output of the copier proper copy collation will be obtained. Alternatively, the documents can be fed in reverse or N to 1 order and the output copies thereof stacked face-up. In the latter case, an inverter can be provided at the output of the document handler, i.e., at the location of the feed-out roller 64, to stack the documents face-up, so that they will be re-collated. Such an inverter can comprise a known 180° turn-over roller transport which stacks the documents face-up on top of the document handling unit. For 1 to N document copying the documents can be simply stacked face-down directly at the output of the downstream end of the platen, as is illustrated in the FIG. 4 embodiment, to maintain them in collated order for re-feeding in 1 to N order, manually or with a known bottom stack feeder. Alternatively, the documents may be fed face-up to an inverting roller which turns them over and delivers them to the platen.

Referring now in further detail to the operation of the above-described registration system in the embodiments of FIGS. 1–3, it will be appreciated that the normal position of the platen, including its position during copying, is a stationary and horizontal position perpendicular the optical axis 16. This is also the position of the platen during the in-feeding of the documents into their registration position. In this normal platen position, as particularly shown in the solid line position in FIG. 3, a sheet stopping vertical surface 66 on the upstream face of the fingers 32 is exposed and extends a pre-set distance above the upper surface 34 of the platen to stop the forward motion of the document. Thus, even through the belts 36 attempt to continue to drive the document forward, the document lead edge cannot pass this fixed surface 66. Thus, positive registration is provided. In this normal and registration position, the platen 12 is out of alignment with the fixed edge member 30, so that this document surface stripping vertical 66 is directly in the movement path of the document. Copying can occur at any time after registration occurs, because neither the fingers 32, their surface 66, or any other part of the fixed edge member 30, or the platen, move before or during copying.

Once the registration and copying of the document on the platen has been accomplished, then the controller 58 actuates the platen shifting means 18, as previously described, to briefly lift the downstream end 20 of the platen upwardly towards alignment with the edge member 30. This movement is only that needed to provide a completely unobstructed movement path of the document downstream from the platen over the fixed edge member 30, by lifting the platen upper surface into alignment with or above the edge member 30.

Unlike the prior art systems described above, the registration edge member 30 does not need to be reacted, nor does the document movement have to be reversed. With this registration system all of the drives in the document transport, e.g., motor 62, can desirably be unidirectional and non-critical. No clutches or reversing means are required for the document transport. The timing of the driving of the document belts is not critical. That is, the document belts need not be started and stopped at a precise position or time with this system. In fact, the drives of the document belts 36 do not even have to be stopped. Nor is there any need to coordinate the operation of, or maintain the alignment of, a registration gate therewith, since the registration is all provided by a stationary member integrally mounted to the frame of the copier.

Preferably the pivotal end 20 of the platen is closely adjacent the fixed edge member 30 and is lifted through (past) alignment with the upper surface of the edge members 30 for said document ejection cycle so that the platen upper surface 34 is slightly above any point on the edge member 30, as shown in the dashed line positions in FIG. 3. This has a number of advantages. First, it eliminates any criticality in the movement distance for the platen. The platen end 20 may be raised, as an example, from anywhere between 1 to 2.5 millimeters, since this is above the desired normal extension of the sheet stopping surface 66 on the fingers 32 above the platen surface 34 for registration.

This platen movement is, in any event, desirably much less than 1 centimeter. Therefore, by appropriate gearing, camming or leverage, as disclosed, a low powered electric motor 22 or conventional solenoid may be utilized for this small platen movement. Preferably, as disclosed here, this is assisted by pivoting the platen 12 about its opposite end 68, which, therefore, supports half the weight of the platen. This pivotal mounting of the platen at its end 68 integrally to the frame of the copier may be by any suitable means, such as the use of a known flexible adhesive plastic hinge. Any gap or clearance provided between this end 68 of the platen and the document feed-in surface on the top of the copier may be filled with compressible foraminous material or the like, or covered, to prevent document feeding obstructions. If desired, a subsequent document may be fed onto the platen while it is still lifted for the ejection of the preceeding document providing the platen is dropped before the lead edge reaches the registration position.

As noted, when the end 20 of the platen is intermittently pivoted upwardly for the unobstructed feeding of each document off of the platen, the sheet stopping surface 66 is completely removed from the movement path of the document, by being recessed below the platen. However, there is another desirable and simultaneous cooperative function of this platen movement. The lead edge area of the document is positively lifted upwardly by the platen into a more positive engagement with the document belts 36. The platen 12 in this area is deformably pushed up into the unsupported flight of the belts 36 in the feed-out area. This increases the normal force between the lead edge of the document on the platen and the belts 36 to provide more positive feeding-out of the document downstream. Also, if a downwardly curled lead edge of a document has entered the small space between the platen end 20 and the surface 66 of the fixed edge member 30, it is lifted out of that space by the upward movement of the platen. This eliminates a known source of document feeding jams in other (moving gate) document registration systems.

It will be noted that this intermittent pivoting of one end of the copier's transparent window 12 occurs only during the non-copying period in which the document is to be transported from the platen over the fixed edge member 30. Any time after the trail edge of the document has passed over the fixed edge member 30 the platen 12 can be automatically shifted back downwardly into its normal stationary copying position. This can be accomplished simply and non-critically by raising the platen for only a pre-set fixed time period, which period is made sufficiently long to allow the largest document to clear the platen. Even if the platen drops prematurely, the use of low normal force document belts and smooth surfaces on the edge member 30 would normally prevent document damage. To positively insure that the document has been completely fed off before the platen is allowed to drop, a sensor can be provided at the downstream end of the platen.

With the apparatus disclosed in FIGS. 1–3, the time period for the platen lifting can be the time for the rotation of the cams 26 by their motor 22, i.e., pre-set by the motor and gearing. The motor 22 can be started and stopped appropriately by the controller 58, or stopped by a switch activated by cam 26.

As disclosed here, the cams 26 are sectored so as to only lift the platen during a partial rotation of the shaft 24, and to otherwise release the platen, i.e., be fully out of engagement therewith. This allows the platen to drop back by its own weight to its supporting stops (mounting points) on the frame of the copier which maintain it aligned perpendicular the optical axis. Alternative, of course, a reversable motor could be utilized. As a further alternative, with an appropriate slope of the cams 26 and appropriate gearing for the motor 22, the removal of electrical power to the motor 22 will allow the weight of the platen 12 bearing down on the cams 26 to reverse their motion. The consequent reversal of the unpowered motor 22 would then act as a damper or brake for the (slower) descent of the platen. However, as described above, the lifting movement of the platen is so slight as not to require any damping other than, preferably, a somewhat resilient mounting surface on the copier frame.

It will be noted that with the system disclosed herein that both the lifted end of the platen 20 and the closely adjacent parallel fixed surface 66 of the fixed edge member 30 may be vertical, i.e., need not be beveled. Besides manufacturing savings, a space saving can be provided, since there is no space required for any moving registration gate mechanism. Only a narrow fixed edge member 30 is required, which can be, as shown, at the outside edge or "corner" of the copier, to provide for unobstructed book copying. Only a very narrow central binding area of a book laid over this corner need be optically obscured with this system. The platen and its imaging area can be extended fully out to this corner.

With the above-described platen shifting means 18, only a single small motor or solenoid connected to a simple cam or other actuating member or finger is required to operate the entire registration system. As disclosed, this entire registration, or here, deregistration, mechanism 18 can be located, as shown, at the side or end of the platen, completely out of the optical path. Although the shaft 24 is disclosed here as running directly under the book copying corner for convenience, and to provide for lifting cams 26 acting at both sides of the platen, it will be appreciated that neither are required. Further, as previously described, for manual copying on the platen, no electrical actuation or manual movement of any document registration member is required.

The embodiment of FIGS. 1–3 could be modified as shown in the embodiment of FIG. 4 so that when the platen is down in its normal position, i.e., during the registration of the document, the downstream portion of the belts 36 would be, (by virtue of engagement by a raised portion of the edge member 30) automatically held slightly above the downstream area of the platen. This provides a reduced normal force between the document belt and the document during registration in this area, for freer de-skewing movement of the document relative to the belts 36. This could be provided by having the edge member 30 extend slightly above the platen's upper surface 34 between the fingers 32 (but less than the fingers 32).

Briefly reviewing the method of operation of the apparatus of FIGS. 1–3, the document sheet to be copied may be transported in a single movement direction onto the transparent window 12 of the copier, positively registered against the fixed registration edge 30 and then further transported in the same direction by being lifted over that fixed edge member 30 at the downstream side of the platen. This is accomplished by intermittently shifting the position of one end 20 of the transparent window 12 relative to this fixed edge member 30 between first and second positions. In the first position the vertical registration surface 66 on the fixed edge member 30 is exposed in the document path for the transported document to be registered against it over the platen window 12. The same end 20 of the transparent window 12 is then shifted to a second and different position relative to the same fixed edge member 30 in which it provides unobstructed transporting of the document sheet thereover. This is accomplished here by raising the upper surface 34 of the transparent window 12 through alignment with to above the level of the uppermost surface of the fixed edge member 30, during a non-copying time period, by a distance of less than approximately 2.5 millimeters. The transparent window 12 is preferably thus pivoted between its first and second positions about a stationary end 68 thereof opposite the lifted end 20. However, the transparent window 12 is normally, and particularly during copying, held stationary and perpendicular the optical axis of the copier. The fixed edge member 30 is normally extending approximately 1.5 to 2.5 mm. above the normal level of the upper surface of the platen to provide a fixed registration edge for either manually placed or fed documents. (More heighth can be provided, but is not needed for more documents).

Referring now the second exemplary embodiment of FIG. 4, there is shown a different document handling unit 100. It has a somewhat different embodiment 102 of the de-registration apparatus, but which corresponds generally to the platen shifting means 18 of FIGS. 1–3. This document handler 100 has a single continuous uniform belt 101 covering the entire platen and extending both upstream and downstream thereof, rather than the short multiple belts 36 of FIGS. 1–3. This belt 10 may be of a well known type disclosed in various of the above-cited references or utilized in the Xerox "9200", "5600", "9400" or "9800" duplicators. The belt 101 is conventionally driven by a motor "M" and conventionally controlled by the controller 104 of the copier. Additional normal force between the belt 101 and the downstream (registration side) edge 106 of the platen 108 may be provided by rollers 110 resiliently engaging the back of the belt 101 there.

In this embodiment of FIG. 4 the fixed edge member 112 of the copier is likewise directly and closely adjacent the downstream, liftable, edge 106 of the platen 208. The platen 208 is likewise pivotally mounted to the copier at its upstream end 107. Here the edge 112 extends uniformly linearly transverse the direction of movement of the belt, I.e., does not have fingers. The edge member 112 thus has a continuous upstream-facing vertical surface 114 for the registration and de-skewing of the documents (corresponding to the discontinuous surface 66 on the fingers 32 of the embodiment of FIGS. 1–3).

In this FIG. 4 embodiment the platen is intermittently raised at its downstream end 106 by a somewhat different platen shifting means 116 to provide the de-registration system 102. An electrical solenoid 118, located inside the copier, but outside of the optical path, pulls on the free end of a long lever arm 120 when it is actuated by the copier controller 104. This lever arm 120 integrally connects to a much shorter lever arm 122. These two lever arms are defined by pivoting the entire lever arm unit about a pivot shaft 124 (corresponding to the shaft 24 of FIGS. 1–3). The shaft 124 similarly extends across the downstream end of the platen 106 and has another equally short lever arm 122 (hidden in this view) at its opposite end adjacent the opposite side of the platen, so that the platen is lifted at both sides. The free ends of both short lever arms 122 may have a roller or smooth cam surface adapted to engage the underside of the platen 108. All of this mechanism 102 is outside of the field of view of the copier optics.

The attraction of the solenoid 118 lifts this cam end of both short lever arms 122 with considerable leverage through its connecting longer lever arm 120. This lifts the platen as long as the solenoid 118 is actuated. This intermittent lifted position is shown in FIG. 4 in the solid line view. Once the solenoid 118 is no longer actuated, i.e., its electrical power is removed, the platen will automatically drop back down to its normal supported position perpendicular the optical axis 126 of the copier. This is illustrated by the alternative dashed line positions in FIG. 4 of the components described above.

With the embodiment of FIG. 4, like the embodiment of FIGS. 1–3, documents are fed in by the unidirectionally driven belt 101 with the platen in its normal (down) position. Positive registration will occur due to the upper surface of the platen 108 being below the upper surface of the fixed edge member 112 so that its vertical abutment surface 114 is exposed in the document path. Also, as shown, the belt 101 is pressued against the upper surface of the fixed edge member 112 directly over this vertical document stopping surface 114. This helps prevent the document from being driven over the edge member 112 during registration.

Once registration and copying have been accomplished, the solenoid 118 is briefly intermittently actuated to briefly lift the downstream end 106 of the platen. As with the previously described embodiment, it is preferable, but not essential, to hold the platen in its raised position (i.e., lifted from below alignment with the edge member 112 through the above alignment therewith) until the document has been fully ejected. Likewise, it may be seen that when the end of the platen is so lifted, it is moved up towards and into the belt 101 (against the belt's tension and its auxillary normal force means 110) to increase the belt 101 normal force against the document during document ejection, and to push the belt awary from the fixed edge member 112.

If some damping is desired for the automatic dropping of the platen thereafter, this can be provided here by applying a reduced holding current to the solenoid, rather than totally removing power therefrom, for the period in which the platen is dropping.

The fixed registration edge 112 may alternatively be undulating to deform the belt and improve stripping of the document lead edge therefrom into the registration surface 114. This is detailed in U.S. application Ser. No. 106,335 filed Dec. 21, 1979 by J. N. May, now U.S. Pat. No. 4,247,095. It also discloses another form of the pre-feeder 44 of FIGS. 1 and 2.

Turning now to the embodiment of FIG. 5, this is a quite different embodiment from the two described above. This is a different but also generally known type of copying system, called a constant velocity transport or CVT, in which the document is copied by moving it at a constant velocity over a narrow platen where it is scanned by a stationary optics system. FIG. 5 is an enlarged view relative to the other figures. As disclosed in this FIG. 5 embodiment, the present invention can be adapted to providea simplified registration and de-registration system, and unidirectional document feeding, in such a CVT system as well.

The embodiment of FIG. 5 may utilize either a single, or multiple set of, document belts, similarly driven by a motor M, and controlled by a controller 204. The single belt 202 here drives a document 206 over a narrow, e.g., 5 centimeter, platen 208. The platen 208 is similarly normally, and during copying, perpendicular the optical axis 210. For the registration of the document 206 to the platen 208 in this FIG. 5 embodiment the platen 208 is pivoted about one end between a raised position (shown in solid lines) and its normal and copying position (shown in dashed lines). This is by a solenoid 212 and its integral piston or connecting member 214, which engages the bottom of the platen 208 outside of the copying area to lift one end 216 of the platen. As shown, the platen 208 may be pivoted about a pivot axis 222. However, as an alternative embodiment, instead of pivoting the platen glass about one end 216, the entire platen 208 could be slightly temporarily lifted. In either case since the platen 208 here is much smaller this lifting may be by this direct connection to the solenoid 212 member 214.

In the embodiment of FIG. 5 there is a significant difference in the operation, however, in that the upstream end 216 of the platen 208 is raised by the solenoid 212 before copying to provide a registration stop on the generally vertical end surface 218 of the platen glass 208 itself, rather than on the adjacent fixed edge member 220. This is the opposite of the previously described embodiments in this regard. The lifted end 216 of the platen 208 is then allowed to drop after this pre-registration and de-skewing has been achieved, i.e., after the document lead edge has been driven thereagainst as shown in FIG. 5. Dropping of the platen into its normal copying position then allows the document to be fed unobstructed over the fixed edge member 220 and over the lowered end 216 of the platen and across the platen 208 for copying. That is, the dropping of the platen here initiates the start of the CVT copying operation, which may be initiated by the controller 204.

This system of FIG. 5 has the same advantages of providing a registration edge (218) which is only intermittently raised into the document path and which is fully removed from the document path for the feeding of the document over the registration edge. Further, it also provides the advantage of a fixed edge member 220 directly adjacent the edge of the platen, i.e., no moving registration gate is required. By positioning the supports for the normal position of the platen (shown in dashed lines) such that the upper surface of the platen is normally aligned with, or slightly below, the uppermost surface 221 of this adjacent fixed edge member 220, as shown, there is no obstruction whatsoever to the feeding of the document except during said intermittent pre-registration cycle when the platen is lifted.

Further, as with the prior embodiments, when the lifted end 216 of the platen is lifted, it resiliently deforms into an unsupported portion of the belt 202 to increase the contact force therebetween. In this FIG. 5 embodiment that provides a more positive prevention of the misfeeding of the lead edge of the document between the platen and the belt while it is being registered, i.e., while the platen end 216 is lifted. It may also be seen that this movement of the edge of the platen glass up into the deformable transport belt 202 can be utilized to temporarily lift the belt 202 in the document pre-registration area above the surface 221 thus reducing the normal force between the belt and the document there and providing for easier de-skewing movement of the document relative to the belt.

It will be appreciated that, unlike the previous two embodiments, in this FIG. 5 embodiment the document is not lifted upwardly by the platen glass. Thus, the document is not lifted away from the slight gap between the generally vertical edge surface 226 of the fixed edge member 220 and the generally vertical end registration surface 218 of the platen. However, a further feature can be provided to reduce the possibility of a downwardly curled document lead edge becoming captured in this gap. This can be provided by the illustrated configuration in FIG. 5, wherein the pivot axis 222 of the platen glass is adjacent the upper surface thereofso that the end surface 218 of the Platen pivots outwardly towards the adjacent fixed surface 226 as the platen lifts. This surface 226 here is slightly undercut or beveled (angled) to allow this movement to only a limited degree. Specifically, it is so designed that when the platen end 216 is pivoted upwardly into its desired raised position that the end surface 218 of the platen comes into direct abutment with this fixed surface 226 at a point adjacent the upper surface 221 of the fixed edge member 220, thereby eliminating the normal slight gap therebetween, as shown. Thus, the lead edge of the document cannot get between these two surfaces 218 and 226 when the platen is lifted, i.e., during the time when the document is being pre-registered by being abutted and overdriven against that portion of the end surface 218 extending above the level of the fixed surface 221. The timing for the lifting of the platen is not critical as long as it is before a document is fed in to be copied, and pre-set fixed timings can be provided. The belt drive M may be continuously operated.

With all of the above-described systems, there may be provided during in-feeding and registration a desirable decrease in pressure between the belt and the document as the document approaches the raised registration edge for skewing movement, plus a desirable increase in document belt pressure against the registration edge itself, to help prevent document escape. No additional mechanism is required here for this desirable pressure other than the weight of the document belt system, since the registration edge is supported on the machine frame. When the solenoid is actuated to lift up the platen glass, here this automatically desirably changes this pressure distribution and presses the lead edge area of the document up against the belt for maximum friction therebetween for ejecting the document from the platen, as well as physically lifting the lead edge of the document up over the registration edge, and reducing the belt pressure on the registration edge. The document is not dragged over the registration edge. If the platen glass is lifted above the level of the top of the registration edge, there will actually be a free space between the top of the registration edge and the document belt for unrestricted document ejection.

It will be appreciated that the present invention may be utilized in many different embodiments from those disclosed herein. For example, the above-described embodiments disclose document feeders which the documents are fed in as well as out by the document transport. However, the present invention may also be utilized in document handlers in which the placement and registration of the document on the platen is manual or semi-manual in all cases, and in which the document transport may consist only of a simple document ejection device. One example is the above referenced U.S. Pat. No. 3,881,581 issued June 10, 1975 to John Caldwell. There the document is ejected after manual placement and copying by small frictional feed rollers engaging the document. These rollers may be driven by a small electric motor as shown there or may be mechanically driven by, for example, a spring wound by the lifting and closing of the platen cover and released by a clutch after copying has been completed. As an alternative to feed rollers, flexible multivaned "flapper" wheels or other simple ejection means may be utilized.

Such flappers, wheels, or other feeders may even be the same as those used as "nudgers" to assist in the registration of document, in a known manner. That is, with this system a registration feeder can be utilized without reversal for the document ejection, as well, because of the removal of the registration edge stop from the document path by the lifting of the platen.

Additionally, and very importantly, the present invention allows simple document feeding devices to be operated continuously without damaging the documents or the platen. They can have only little or no contact with the document during registration and copying, because with the present system the spacing between the operating surface of the feeding wheel, flapper or other device from the platen can be much greater during the normal and copying periods. The lifting distance of the downstream edge of the platen can be made to correspond to this normal spacing of the feeding mechanism from the platen so that the platen lifts the document into strong contact with the feeding mechanism only during the desired document ejection period. That is, the feeder contact is changed from a slight, slipping, contact into a much more positive higher friction feeding contact for document ejection. Thus, the feed wheels, flappers, or other document drives can be continuously operated without damaging the document during copying, yet provide a more than sufficient ejection force on the document after copying.

Being able to operate a document ejection feed mechanism or other document transport continuously has a number of advantages. Since it need not be started and stopped at specific times, its control is not critical. The electrical circuitry and/or clutches for switching power to the motor may be simplified or eliminated. The feeder's performance characteristics, including acceleration, torque, and deceleration are much less critical, and a simpler and less expensive and lower powered drive system may be utilized. In fact, a continuously operating electric motor driven feeder with low power but high inertia (which may be assisted by an inertial flywheel), may be desirably utilized. The rotational inertia can be utilized for increasing the initial torque and initial acceleration on the document for ejection. Once the document has been ejected, the load can be reduced quickly with this system. I.e., the friction between the feed mechanism and the platen glass can be greatly reduced or eliminated by the dropping of the platen back to its normal position.

It will be appreciated that with any of the three above-described embodiments that further refinements or alternatives may be provided. While the embodiments disclosed herein are preferred, it will be appreciated that numerous other variations and modifications will be obvious to those skilled in the art, and they are intended to be encompassed by the following claims:

I claim:

1. A document registration apparatus for registering a document sheet which is transported by a document transport (10, 100, 202) in a movement path over the transparent copying window (12, 108, 208) of a copier having an optical axis (16, 126, 210) and a fixed edge member (30, 112, 220) stationarily mounted to the copier characterized by:

one end (20, 106, 216) of said transparent window (12, 108, 208) being closely adjacent but movable into and out of alignment relative to said fixed edge member (30, 112, 220), and means (18, 102, 212) for intermittently shifting the position of said one end (20, 106, 216) of said transparent window which is adjacent said fixed edge member towards and away from alignment with said fixed edge member, to interpose a document sheet obstructing registration surface (66, 114, 218) in the movement path of the document sheet to register said document sheet relative to said transparent window when said transparent window is shifted by said means (18, 102, 212) out of alignment with said fixed edge member and to provide an unobstructed movement path for said document over said transparent window and over said fixed edge member when said transparent window is shifted towards alignment with said fixed edge member;

said means (18, 102, 212) for shifting said transparent window maintaining said transparent window during copying in a stationary copying position perpendicular said optical axis of said copier and shifting said transparent window out of said copying position during a non-copying time period.

2. A document registration apparatus according to claim 1, in which said document sheet obstructing registration surface (66, 104) is a generally vertical surface on said fixed edge member (30, 112) which normally and during copying, projects substantially above the plane of the upper surface of said transparent window (12, 108); and in which said means (18, 102) for shifting the position of said transparent window intermittently pivotally raises said one end (20, 106) thereof upwardly to at least the level of said fixed edge member during a non-copying time period to provide unobstructed transporting of the document sheet by said document transport (10, 100) from said transparent window over said fixed edge member.

3. A document registration apparatus according to claim 1, in which said fixed edge member (220) is normally, and during copying, substantially in the same plane as said transparent window (208), and wherein (said means (212) for) intermittently shifting the position of said transparent window intermittently raises said one end (216) thereof substantially above the level of said fixed edge member to impose a document sheet alignment surface (218) on said raised end (216) of said transparent window into the movement path of a document sheet from said fixed edge member towards said transparent window.

4. A document registration apparatus according to claims 1, 2, or 3, in which said means (18, 102, 212) for intermittently shifting the position of said one end of said transparent window comprises electrically actuated lifting means (22, 118, 212) connected to lift said transparent window, from outside the copying area thereof, by less than approximately one centimeter.

5. A document registration apparatus according to claim 4, in which said transparent window is automatically shifted downwardly into its normal stationary copying position by gravity except when said electrically actuated lifting means is actuated.

6. A document registration apparatus according to claims 1, 2 or 3, in which said document transport comprises at least one deformable document feeding belt (36, 101, 202) commonly overlying both said fixed edge member and at least an adjacent portion of said transparent window; and in which said means (18, 102, 212) for intermittently shifting said transparent window moves said one end (20, 106, 216) of said transparent window deformably into said belt.

7. A document registration apparatus according to claims 1, 2 or 3, in which said document transport comprises at least one deformable document feeding belt (36, 101, 202) normally overlying both said fixed edge member and said one end (20, 106, 216) of said transparent window; and in which said means (18, 102, 212) for intermittently shifting said transparent window moves said one end (20, 106, 216) of said transparent window towards said belt to increase the normal force therebetween and to push said belt away from said fixed edge member; and in which the opposite end (68, 107, 224) of said transparent window is pivotably mounted to said copier.

8. A document registration apparatus according to claim 7, in which said document sheet obstructing registration surface (66, 104) is a generally vertical surface on said fixed edge member (30, 112) which normally and during copying, projects substantially above the plane of the upper surface of said transparent window (12, 108); and in which said means (18, 102) for shifting the position of said transparent window intermittently pivotally raises said one end (20, 106) thereof upwardly to at least the level of said fixed edge member during a non-copying time period to provide unobstructed transporting of the document sheet by said document transport (10, 100) from said transparent window over said fixed edge member, in which said means (18, 102, 212) for intermittently shifting the position of said one end of said transparent window comprises electrically actuated lifting means (22, 118, 212) connected to lift said transparent window, from outside the copying area thereof, by less than approximately one centimeter.

9. A document registration apparatus according to claim 8, in which said transparent window is automatically shifted downwardly into its normal stationary copying position by gravity except when said electrically actuated lifting means is actuated.

10. A document registration method for registering a document sheet which is transported (10, 100, 202) in a movement path onto the transparent window (12, 108, 208) of a copier for copying, and which document sheet is also transported over a fixed edge member (30, 112, 220) at one side of said transparent window of said copier, characterized by;
intermittently shifting the position of one end (20, 106, 216) of said transparent window into a first position relative to said fixed edge member to expose a document registration surface (66, 114, 218) in the document path against which said transported document sheet may be registered relative to said transparent window,
and then shifting said same end of said transparent window to a second and different position relative to said same fixed edge member which provides unobstructed transporting of a document sheet over said fixed edge member.

11. A document registration method according to claim 10, in which said intermittent shifting of the position of said one end of said transparent window between said first and second positions moves the upper surface of said transparent window from out of alignment with the upper surface of said fixed edge member towards alignment therewith.

12. A document registration method according to claim 10, in which said transparent window is normally, and during copying, held stationarily perpendicular the optical axis of the copier, and said shifting of one end comprises briefly repositioning said transparent window slightly non-perpendicular to said optical axis only during a non-copying time period.

13. A document registration method according to claim 10 in which, in one of said first or second positions, the upper surface of said one end of said transparent window is raised above the level of the uppermost surface of said fixed edge member.

14. A document registration method according to claim 10, in which the document is so transported when said transport window is in said second position, and is transported in the direction from said transparent window towards and over said fixed member, and in which said transparent window is automatically raised vertically at one end to at least the level of the upper surface of said fixed edge member in said second position and only during a non-copying time period, and automatically lowered into said first position before and during all copying time periods.

15. A document registration method according to claim 10, in which said transparent window is normally, and during copying, held stationarily perpendicular the optical axis of the copier, and said shifting of one end comprises briefly pivoting said transparent window slightly non-perpendicular to said optical axis during a non-copying time period, and in which said transparent window is pivoted out of the horizontal only during a non-copying time period and by a total distance of less than one centimeter at said shifted end between said first and second positions.

16. A document registration method according to claims 10, 11, 12, 13 or 14, in which said transparent window is pivoted out of the horizontal, only during a non-copying time period, and by a total distance of less than one centimeter at said shifted end between said first and second positions.

17. A document registration method according to claims 10, 11, 12, 13 or 14, in which said shifting of said one end of said transparent window is by less than approximately 2.5 mm.

18. A document registration method according to claim 16, in which said transparent window is so pivoted between said first and second positions about a stationary end (68, 107, 224) thereof pivotally mounted to said copier opposite from said shifted end.

19. A document registration method according to claim 12, in which, in one of said first or second positions, the upper surface of said one end of said transparent window is raised above the level of the uppermost surface of said fixed edge member, and is shifted by a total distance of less than one centimeter between said first and second portions.

20. A document registration method according to claims 10, 11, 12, 13 or 14, in which said one end of said transparent window is so shifted into an overlying deformble document transport belt (36, 101, 202) to increase the document feeding normal force therebetween and to push said belt away from said fixed edge member.

21. A document registration method according to claim 20 in which said transparent window is normally, and during copying, held stationarily perpendicular the optical axis of the copier, and said shifting of one end comprises briefly pivoting said transparent window slightly non-perpendicular to said optical axis during a non-copying time period, and in which said transparent window is pivoted out of the horizontal only during a non-copying time period and by a total distance of less than 2.5 mm at said shifted end between said first and second positions.

22. A document registration method according to claims 10, 11, 12, 13 or 15, in which said fixed edge member 220 is normally, and during copying, substantially in the same plane as said transparent window (208), and wherein in said second position said intermittently shifting the position of said transparent window intermittently raises said one end (216) thereof substantially above the level of said fixed edge member to impose a document sheet alignment surface (218) on said raised end (216) of said transparent window into the movement path of a document sheet from said fixed edge member towards said transparent window.

* * * * *